United States Patent [19]

Palotsee

[11] 4,136,974
[45] Jan. 30, 1979

[54] SEAL AND PROPELLER DRIVE ASSEMBLY FOR INDUSTRIAL CLEANING TANKS

[76] Inventor: John J. Palotsee, P.O. Box 1127, Youngstown, Ohio 44501

[21] Appl. No.: 823,466

[22] Filed: Aug. 10, 1977

[51] Int. Cl.² ............................................. B01F 7/06
[52] U.S. Cl. ....................................... 366/283; 277/87; 366/292; 416/174
[58] Field of Search ............... 366/245, 247, 249, 252, 366/281, 283, 297; 416/174, 93 A, 93 R, 244 B; 277/87, 93 SD, 93 R

[56] References Cited

U.S. PATENT DOCUMENTS

| 3,092,185 | 6/1963 | Alexander | 416/93 |
| 3,313,551 | 4/1967 | Voitik | 277/93 |
| 3,722,896 | 3/1973 | Tankus | 277/87 |
| 3,762,690 | 10/1973 | Harrington | 366/249 |
| 3,964,733 | 6/1976 | Tutzschky | 366/282 |

Primary Examiner—Robert W. Jenkins
Attorney, Agent, or Firm—Oldham, Oldham, Hudak & Weber Co.

[57] ABSTRACT

An industrial cleaning machine that has a driven propeller means extending from a housing assembly for stirring liquid in the tank and an output shaft connected to the propeller means and carried by the housing assembly, the tank having an ear portion on a side thereof for receiving the propeller means. An apertured top plate extends over and forms a cover enclosure for this ear portion and the propeller means and housing assembly, which is of substantially L-shape, are supported on such cover enclosure. The apparatus has a seal assembly including a first seal ring having a flat side edge face thereon extending normal to the axis of the output shaft operatively positioned on the output shaft and a second seal ring having a flat side edge face thereon positioned adjacent to and engaging the first ring side edge face, tubular cover and compression means operatively engage the output shaft and seal rings to force the adjacent seal faces together to form a liquid and lubricant seal for the housing. The cover and compression means include an O-ring carried on a sleeve on the output shaft and metal rings on each side of the O-ring and having faces tapering in towards and engaging the O-ring and compressing it against the sleeve to form a liquid seal therearound.

7 Claims, 5 Drawing Figures

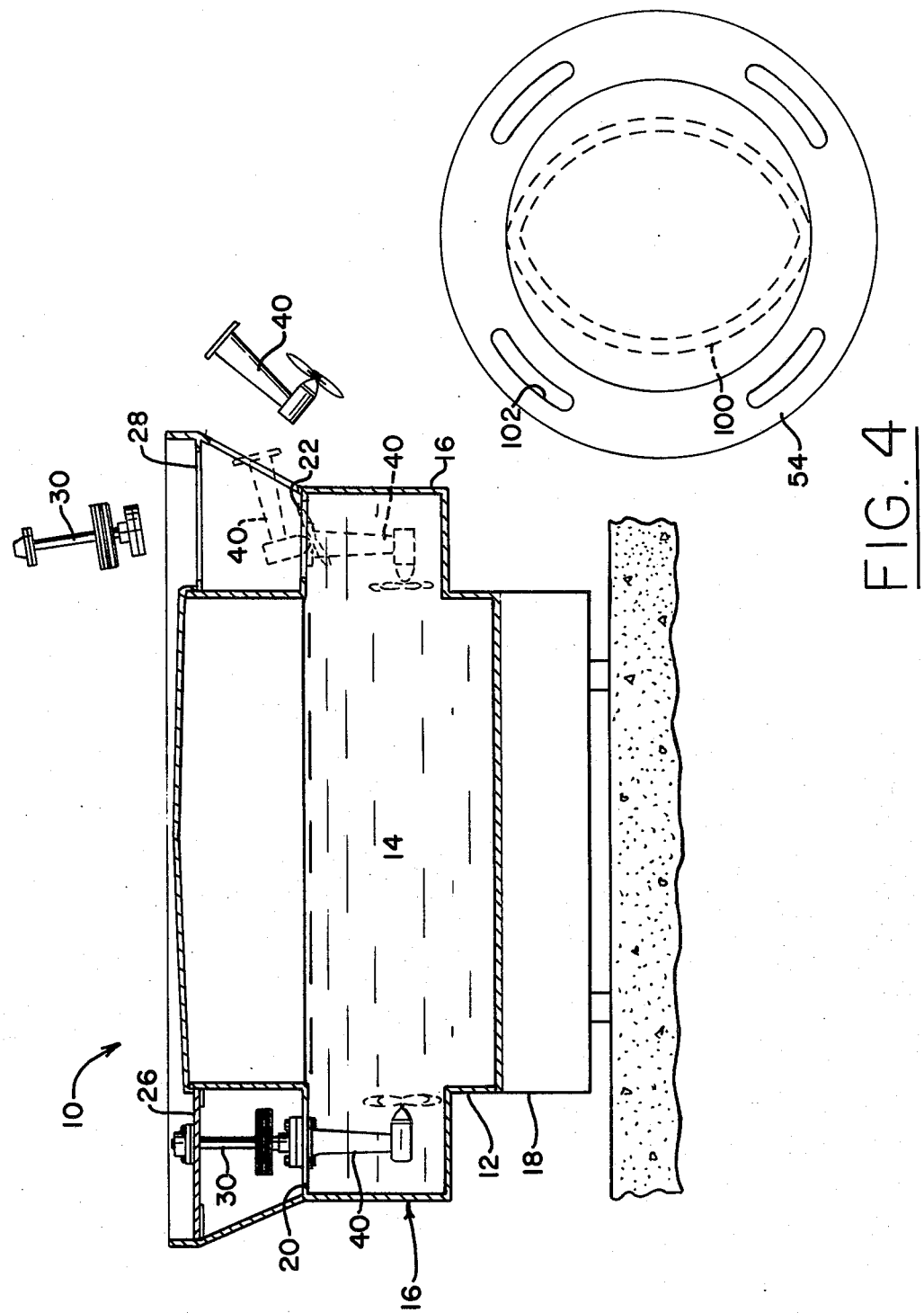

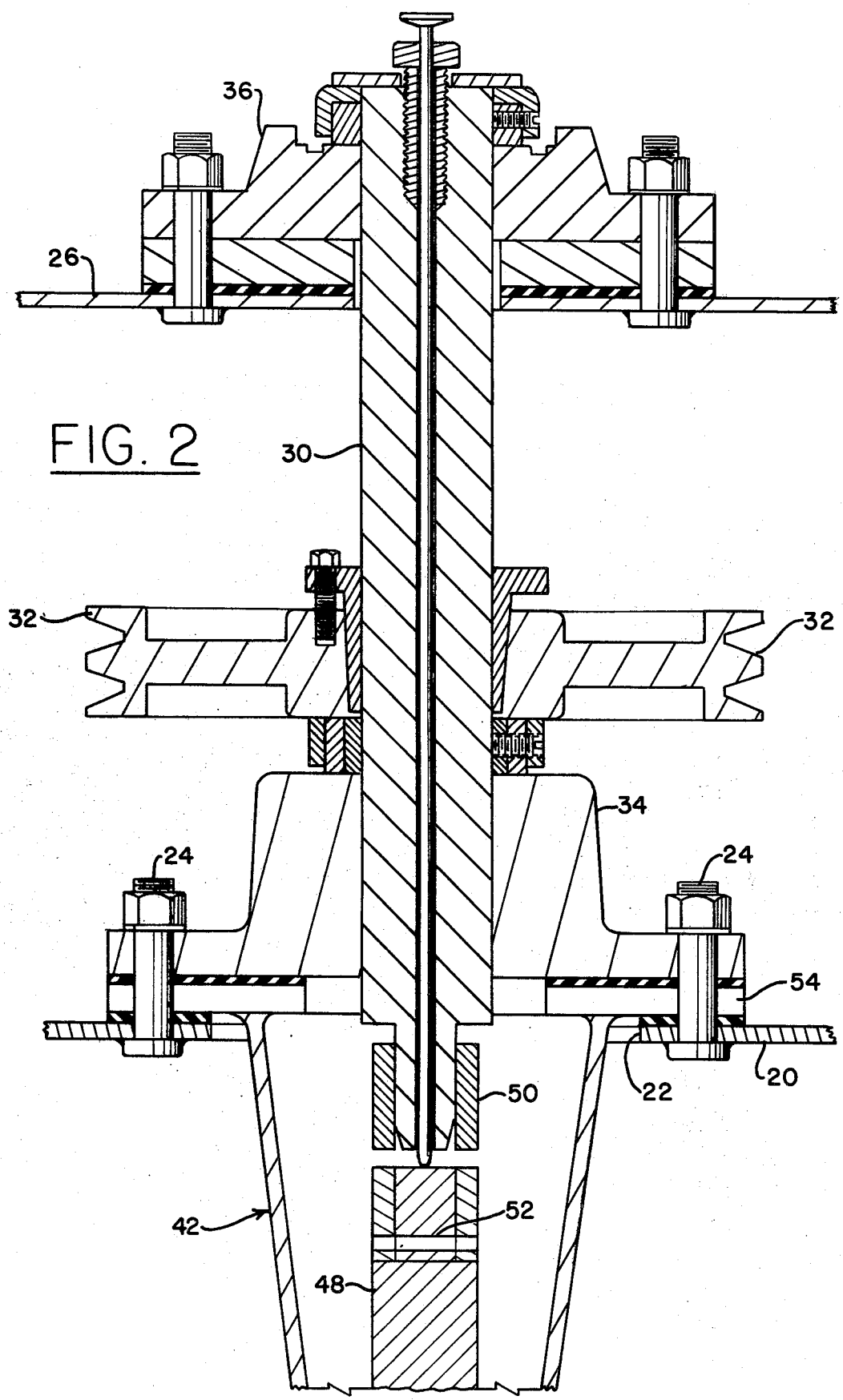

SEAL AND PROPELLER DRIVE ASSEMBLY FOR INDUSTRIAL CLEANING TANKS

BACKGROUND OF THE INVENTION

Heretofore there have been many different types of industrial cleaning machines or apparatus provided. Some of these structures are shown in my prior U.S. Pat. Nos. 2,619,100; 2,564,443 and 2,437,968. Industrial tank cleaners of the types shown in these patents have been made and sold commercially for a number of years. However, in these industrial cleaners, there is an outboard motor type of a drive means and mixing propeller provided to stir the hot cleaning materials usually used therein. Heretofore, tanks of the type referred to have had relatively good service lives and have done excellent cleaning actions, but there is the problem of sealing the housing and drive means for the drive propeller so that the hot cleaning liquid or other material in the tank does not work its way into the propeller drive assembly. And service has been required for these seals in prior types of these cleaners.

Accordingly, it is the general object of the present invention to provide a new and improved propeller and drive means assembly for industrial cleaning machines and particularly to propeller and drive means that can be readily assembled onto or be moved from engagement with the remainder of the cleaning tank.

Another object of the invention is to provide a propeller and drive unit for industrial cleaning apparatus and wherein improved seal means are present between the rotary output shaft of the drive unit and the stationary housing means enclosing lubricant for the propeller and drive unit therein.

Other objects of the invention are to provide a seal in a drive unit for use in submerged liquid conditions wherein the seal includes first and second hardened metal seal rings having flat sides thereon and resiliently pressed into engagement for sealing action between a rotary seal ring and a stationary seal ring; to provide an additional pair of seal rings wherein they have an O-ring positioned therebetween and tapered faces on the rings engage the O-ring and force it to compress and seal against a sleeve unit on which it is positioned; another object of the invention is to provide carbide seal rings for sealing a driven output shaft in an industrial cleaning machine and wherein an annular recess is formed in a flat face of one seal ring intermediate the radially inner and outer edges thereof and wherein such apertured seal face engages a flat surface of an adjacent seal ring operatively associated therewith; and to form an improved seal assembly for a drive shaft.

The foregoing and other objects and advantages of the invention will be made more apparent as the specification proceeds.

Reference now is made, particularly, to the accompanying drawings, wherein:

FIG. 1 is a partly diagrammatic vertical section of an industrial cleaning apparatus of the invention;

FIG. 2 is a fragmentary enlarged vertical section of the upper portion of the housing and propeller drive unit of the invention;

FIG. 4 is a plan of the propeller and drive unit upper housing.

When referring to corresponding members shown in the drawings and referred to in the specification, corresponding numerals are used to facilitate comparison therebetween.

INVENTIVE SUBJECT MATTER

Figures 3, 3A:
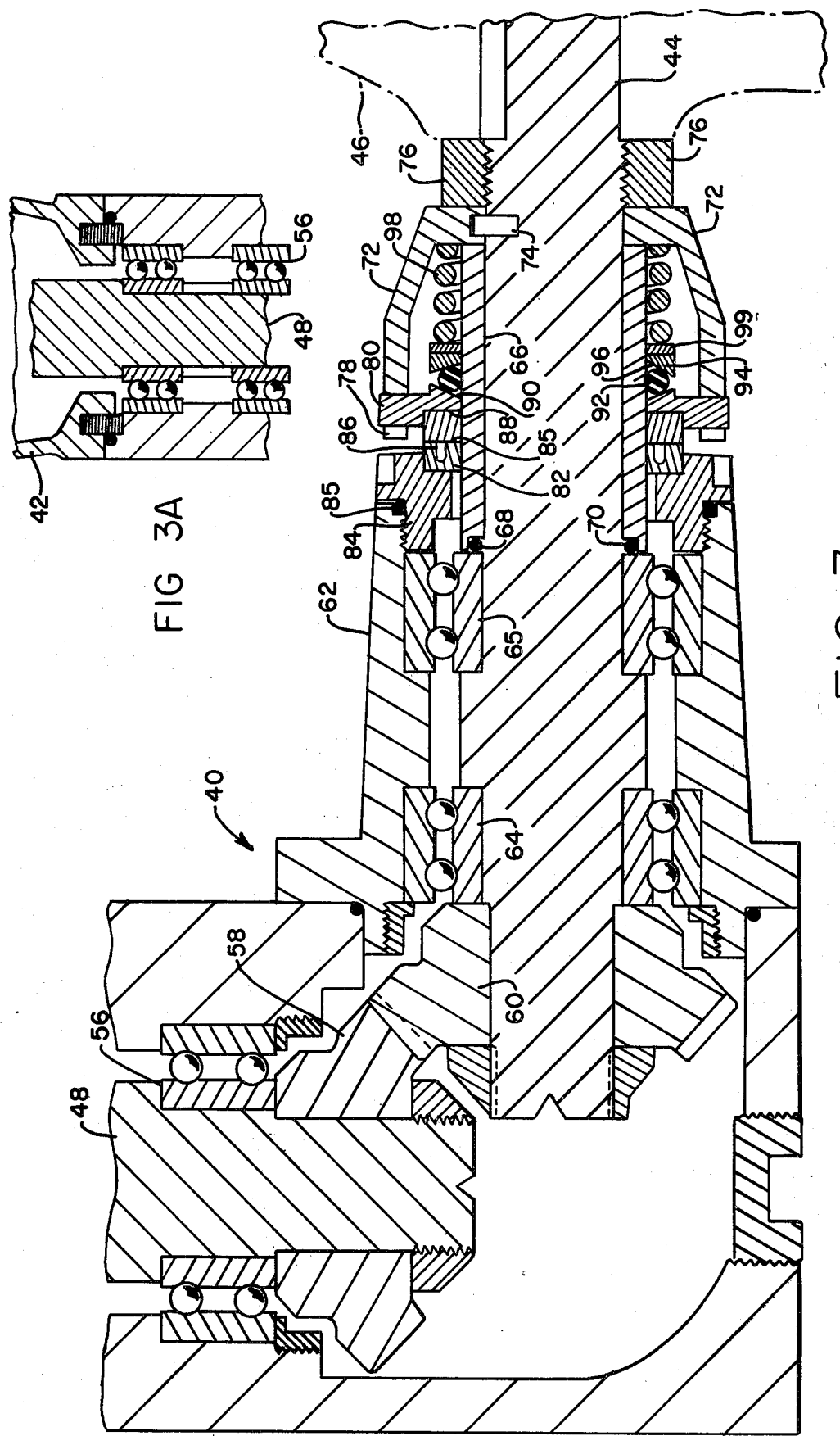
FIG. 3 is a vertical section through the lower portion of the housing and drive unit for the propeller and drive means of the invention.
FIG. 3A is a section through the lower portion of the housing and connector shaft.

The industrial cleaning machine provided, as one embodiment of the invention, includes a tank for receiving cleaning fluid therein, the tank having an offset vertically extending ear portion at one area of its periphery, and propeller means for stirring liquid in the tank, an apertured top plate for the tank extending over and forming a cover enclosure for the ear portion of the tank, a support flange means on the tank above the top plate, a propeller and drive unit including a housing operably secured to the top plate and extending downwardly of the tank, drive means for the propeller and drive unit operably carried by the tank and including a stub shaft telescopically engaging the propeller and drive unit and journalled on and extending between the top plate and support flange means to be separately removable in relation to the propeller and drive unit, and seal means for an output shaft journalled in the housing and mounting the propeller thereon. The seal means including a stationary first seal ring carried by the housing and encompassing the shaft, a second seal ring operatively positioned on the shaft, both seal rings having flat side edge faces adjacent each other extending normal to the axis of the shaft, a tubular cover and compression means operatively engaging the output shaft and forcing the adjacent seal faces together to form a liquid and lubricant seal for the housing, the cover and compression means further including an O-ring operatively carried on the periphery of the shaft and metal rings on each side of the O-ring and having faces tapering in towards and engaging the O-ring and compressing it against the output shaft to form a liquid seal therearound.

With reference to the details of the construction shown in the drawings, an industrial cleaning apparatus or machine is indicated as a whole by the numeral 10. This apparatus 10 includes a tank 12 that contains a volume of any suitable industrial cleaning liquid 14. The tank 12 has one or more ears or laterally outwardly extending projections 16 formed thereon and and these ears or projections may extend the height of the liquid containing portion of the tank or they may be shorter vertically than the remainder of the tank, all as indicated in the drawings. The tank 12 may have a secondary bottom forming section 18 provided thereon to form a compartment for use in cleaning the tank and/or dirt or solids materials collecting in the tank for removal therefrom, all as is well known in the art.

The tank 12 has a cover enclosure provided for the offset or ear portion 16 thereof and this is shown as comprising a top plate 20 that covers an aperture 22 in the upper part of the ear portion. The top plate 20 is secured in position on the tank 12 in any suitable manner as by bolts 24. The apparatus also includes a support flange means 26 removably secured to an upper part of the tank 12 and covering an aperture 28 in that part of the tank. Normally the tank sidewall is open between the flange means 26 and top plate 20 and any suitable bracket or other device (not shown) mounts a drive member on the tank near such top plate. Such drive member normally connects to and drives a stub shaft 30 which has a drive sheave 32 thereon by belts or equivalent means used for conventional drive actions. Suitable bearing members 34 and 36 operatively journal the stub shaft 30 therein and such bearing means are removably secured to the top plate 20 and enclosure plate 26 in any known manner.

A propeller and drive unit indicated as a whole by the numeral 40 is provided and it includes housing means 42, an output shaft 44 protruding from the housing, and a propeller 46 mounted on the end thereof. The propeller and drive unit 40 is of generally L-shape and it is of such a size that it will pass through the aperture 22. The stub drive shaft 30 engages with a connecting shaft 48 suitably journalled in a vertically extending portion of the housing. The unit 40 must be tilted and be threaded into the aperture 22 as indicated in FIG. 1.

The stub shaft 30 is connected to the connector shaft 48, as by a sleeve 50 having internal contour complementary to the protruding hexagonal end of the stub shaft 30 for removable drive interconnection therebetween, and an opposite end portion of this sleeve 50 connects to and engages the hexagonal shaped upper end of the connector shaft 48. A pin 52 extends through the sleeve 50 and shaft 48 to secure them together. However, when desired, the bearings 34 and 36 can be loosened from engagement with their support means, the stub shaft 30 and drive unit can be removed after the sheave 32 is cleared. Or the member 26 can be removed with the stub shaft, as desired.

Any known seal means can be provided between the bearing 34 and an adjacent upper flange 54 formed at the upper end of the housing means to seal the lubricant therein and prevent moisture from entering the housing. This connector shaft 48 is journalled at its lower end in the housing 42 in any conventional manner as by bearings 56 or the like. Further, the bevel drive gear 58 is secured to the lower end of the connector shaft and it engages a companion bevel gear 60 suitably secured to and carried by the axially inner end of the output shaft 44.

The housing 42 has a separate end section 62 that has, usually, a pair of axially spaced bearings 64 and 65 therein that journal the output shaft 44 therein. This section 62 extends only a portion of the length of the output shaft that protrudes therefrom to position the propeller in the liquid 14 in the tank 12. The section 62 is bolted to a side of a corner connector housing 63 that in turn is bolted by bolts 67 to the lower end of the housing 42 or to an extension section thereon.

The primary portion of the propeller and drive unit 40 which requires seal means therein is the rotary portion of the apparatus connected to the propeller 46 and the stationary portion of the apparatus as reflected by the housing 62. Now in order to obtain this seal action, usually a hardened metal sleeve 66 is positioned on the output shaft adjacent the axial outer end thereof and it has an O-ring 68 carried on a shoulder 70 formed on the axially inner end of the sleeve on the radially inner peripheral portion thereof. The O-ring is of such a size as to be compressed against the shaft and an adjacent end of the bearing 65 when the sleeve is forced to its axially innermost position.

A driven enclosure or cover means 72 is secured to the output shaft by key 74 and the axially outer end of the cover is forced as by a lock ring 76 engaging the output shaft to press the sleeve 66 axially inwardly as described. This cover means 72 has an axially extending portion radially larger than the sleeve 66 and it may terminate, for example, in a slotted end portion 78 that in turn engages with a complementary shaped or slotted carrier ring 80 that extends radially inwardly of the apparatus at the inner end of this cover 72. The interengagement of the end 78 with the ring 80 is such as to drive such ring and to operatively engage the ring and cover 72, the ring 80 extending radially inwardly to terminate adjacent the outer periphery of the sleeve 66.

An important portion of the seal means of the invention is provided by a stationarily positioned seal ring 82 which normally is secured as by a suitable temperature and acid resistant cement to a positioning sleeve 84 in threaded engagement with the axially outer end of the housing section 62. Such seal ring has an annular recess 86 formed in a flat face 85 thereof between the radially inner and outer edges thereof. Such flat face is adapted to be positioned immediately adjacent a similar flat face 87 of a second seal ring 88 operatively secured to the carrier ring 80 on the cover 72. Such carrier ring has an axially outer face 90 formed thereon which face is slanted or beveled in a direction extending axially outwardly of the assembly and which face is adapted to engage with an O-ring 92 positioned on the sleeve 66. A second metal ring 94 is operatively positioned on the sleeve 66 and it has a face 96 formed thereon that tapers axially inwardly of the sleeve and propeller assembly so that the O-ring 92 is secured between these two surfaces 90 and 96 to be compressed thereby radially inwardly against the periphery of the sleeve. Such pressure is set up on these members by means of a conventional coil spring 98 operatively compressed between the end of the cover 72 and the ring 96 that may have a reenforcing washer 99 provided thereon. The assembly of the cover and associated means is such as to place the O-ring 92 under satisfactory compression and also to place good compressive action against the two abutted flat faces of the seal rings 82 and 86 for seal action around the sleeve 66. Usually there is some slight clearance provided between the radial inner edges of the seal rings 82 and 88 and the O-ring 92 prevents liquid from the cleaning tank from flowing in around the cover member 72 to reach areas of the housing. Likewise, lubricant in the housing cannot flow therefrom because of the seal ring 82 and its sealing engagement with the ring 86. An O-ring seal 85 is provided for the positioner sleeve 84.

Preferably these seal rings 82 and 88 are formed from a hard, durable metal such as carbide and usually or preferably the ring 88 is slightly harder than the ring 82 and more durable in its wearing action. The members 80, 84 and 72 may also be formed of carbide, if desired. The slot or recess 86 aids in obtaining both an external and an internal seal by the ring 82. But the recess is believed to be especially effective in aiding the rings 82 and 88 in preventing hot cleaning liquid from seeping into the drive housing.

Preferably the housing means 42 is streamlined in contour as indicated at 100 in FIG. 4 with the longer housing diameter being parallel to the axis of the drive shaft 44 to facilitate flow of liquid past the housing. Also, to adjust the direction of circulation or liquid flow from the ear portion of the tank into the tank, arcuate slots 102 are formed in the top flange 54 to receive the bolts 24 and permit arcuate adjusting movement of the propeller and drive unit on its vertical axis before it is fixedly secured in position.

Hence, from the foregoing, it is believed that the objects of the invention have been achieved and a new and improved seal means has been provided for an industrial cleaning machine operating in industrial cleaning solvents and cleaner materials. Furthermore, the drive means for the propeller unit of the invention is readily assembled into the apparatus and it is also easily removed therefrom when desired for inspection, repair or other action. Thus, the objects of the invention are achieved.

While one complete embodiment of the invention has been disclosed herein, it will be appreciated that modification of this particular embodiment of the invention may be resorted to without departing from the scope of the invention.

What is claimed is:

1. An industrial cleaning machine including a tank for receiving cleaning liquid therein, which tank has an offset, vertically extending ear portion at one area of its periphery, an apertured top plate for said tank extending over and forming a cover enclosure for said ear portion, a support flange means on said tank above said top plate, a propeller and drive unit including a housing operably secured to said top plate and extending downwardly of the tank for stirring action, drive means for said propeller and drive unit operably carried by said tank and including a stub shaft telescopically engaging said propeller and drive unit and journalled on and extending between said top plate and support flange means to be removable separately from said propeller and drive unit, said propeller and drive unit being of substantially L-shape, said aperture of said top plate being of a size to permit said propeller and drive unit to be removed therethrough.

2. An industrial cleaning machine, as in claim 1, and including an output shaft journalled in said housing, seal means for said output shaft and including a sleeve positioned on and rotating with said output shaft, a stationary first seal ring carried by said housing and encompassing said sleeve, said first seal ring having a flat side edge face extending normal to the axis of said sleeve, a second seal ring having a flat side edge face extending normal to the axis of said sleeve positioned on said sleeve, the flat edge faces of said seals being adjacent, tubular cover and compression means operatively engaging said output shaft and forcing said adjacent seal faces together to form a liquid and a lubricant seal for said housing, said cover and compression means including an O-ring carried on the periphery of said sleeve, and metal rings on each side of said O-ring and having faces tapering in towards said O-ring and compressed thereagainst to form a liquid seal around said sleeve.

3. An industrial cleaning machine as in claim 1, and including an output shaft comprising a portion of said propeller and drive unit, and two seal rings with flat side surfaces in pressure engagement, said seal rings being operatively positioned between said housing which is stationary and said rotary output shaft to form a seal therebetween.

4. An industrial cleaning machine as in claim 3, and where one of said seal rings is stationary and is secured to said housing, said one seal ring having an annular recess formed in the said flat side surface thereof intermediate the radially inner and outer edges thereof to aid in forming a seal with the flat surface of the second seal ring.

5. An industrial cleaning machine as in claim 1 where said propeller and drive unit is of greater length in the foot propeller portion thereof than the diameter of the aperture in said top plate but said propeller and drive unit being movable through said aperture by being tilted and by its foot propeller portion being threaded into and out of said aperture, said drive means being disengaged from said tank when said propeller and drive unit is engaged with or disengaged from said tank.

6. In a propeller construction for use in an industrial cleaning solution tank, the combination of a substantially L-shaped housing means having an output shaft journalled in said housing in the foot portion thereof and extending therefrom, a cover sleeve on said output shaft, a propeller secured to said output shaft, a stationary first seal ring secured to said housing and encompassing said output shaft, said first seal ring having an edge face extending normal to the axis of said shaft, a second seal ring having a flat edge face extending normal to the axis of said shaft operatively positioned thereon, the flat edge faces of said seals being adjacent, a tubular cover means; and resilient compression means operatively engaging said sleeve on said output shaft and forcing said adjacent seal faces together to form a liquid and a lubricant seal for said housing, said compression means including an O-ring operatively carried on said shaft and two metal rings one on each side of said O-ring and having faces tapering in towards said O-ring to be compressed thereagainst and press it against said cover sleeve to form a liquid seal around said shaft at an end thereof adjacent the propeller by the forces set up by said compression means, one of said metal rings having radially extending portions axially slidably engaging said cover means, said cover means being operatively secured to said output shaft, said cover means being interlocked with said one metal ring to rotate the same.

7. In a construction as in claim 6, an O-ring seal means on the axially inner end of said sleeve to seal the inner periphery of said sleeve against liquid from the tank flowing by said sleeve and into said housing means.

* * * * *